April 9, 1940. F. W. COTTERMAN Re. 21,418
PLANETARY AUTOMOTIVE TRANSMISSION GEARING
Original Filed June 15, 1935 4 Sheets-Sheet 1
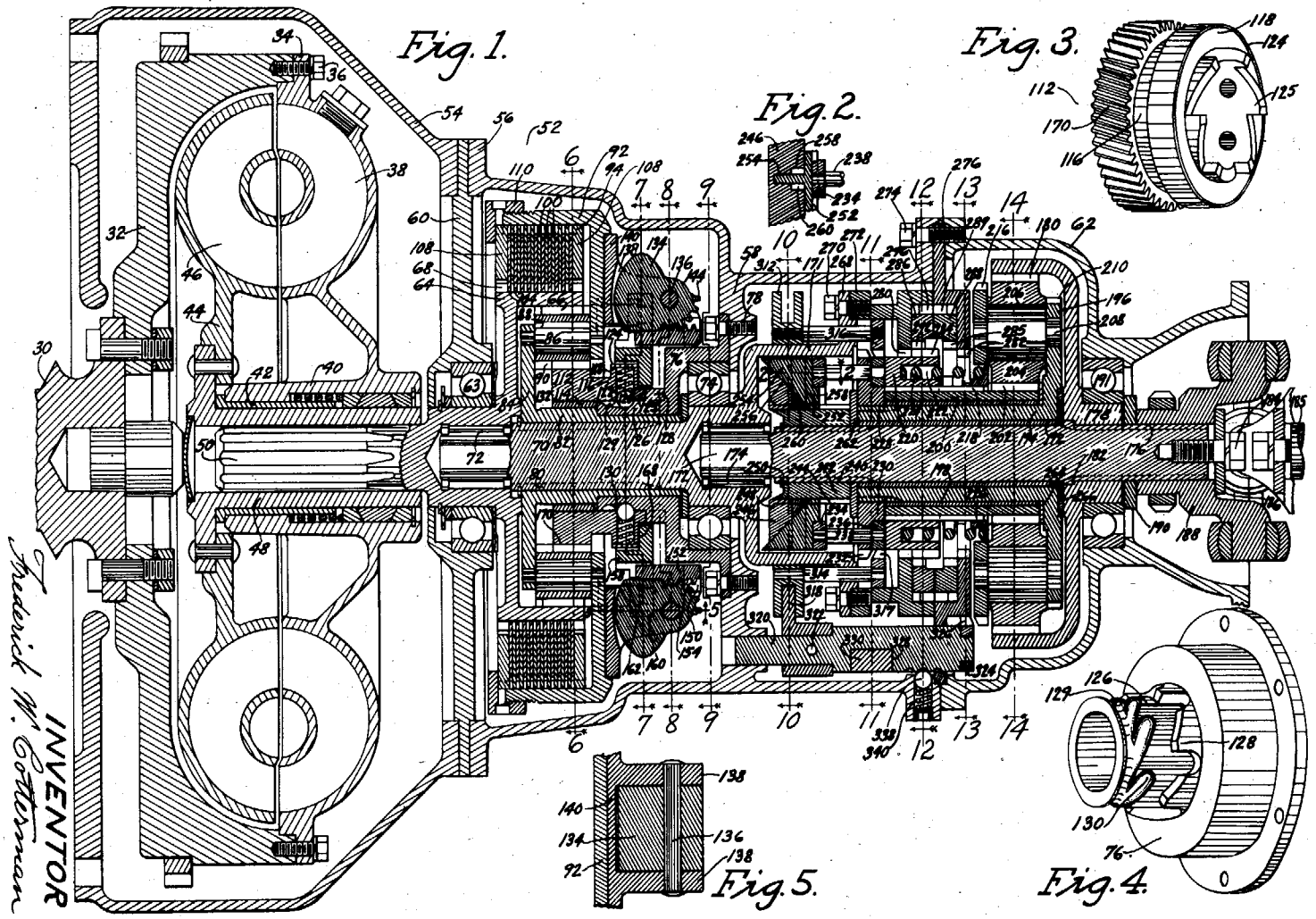
INVENTOR
Frederick W. Cotterman April 9, 1940. F. W. COTTERMAN Re. 21,418
PLANETARY AUTOMOTIVE TRANSMISSION GEARING
Original Filed June 15, 1935 4 Sheets-Sheet 2
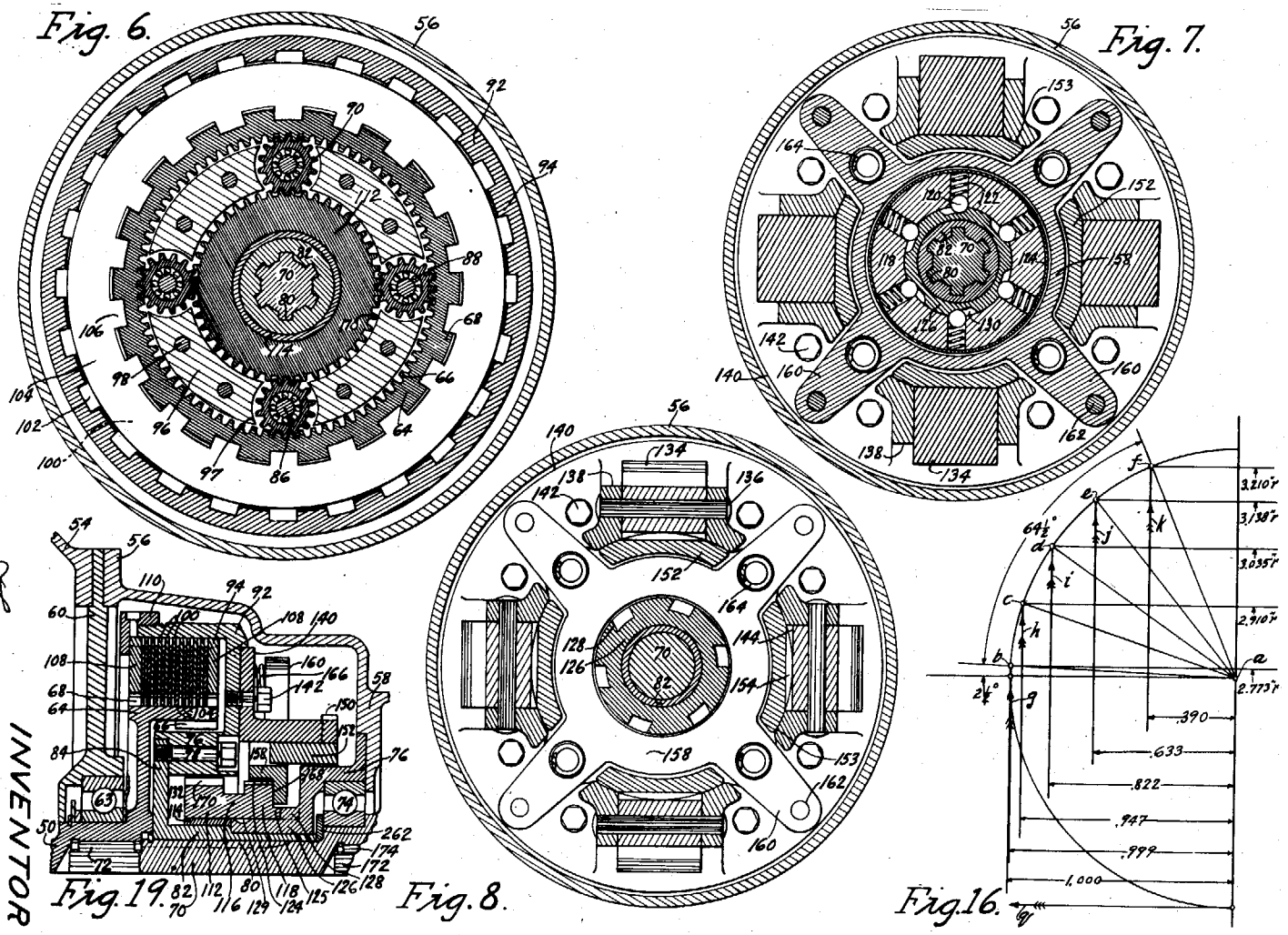
INVENTOR
Frederick W. Cotterman April 9, 1940. F. W. COTTERMAN Re. 21,418
PLANETARY AUTOMOTIVE TRANSMISSION GEARING
Original Filed June 15, 1935 4 Sheets-Sheet 3
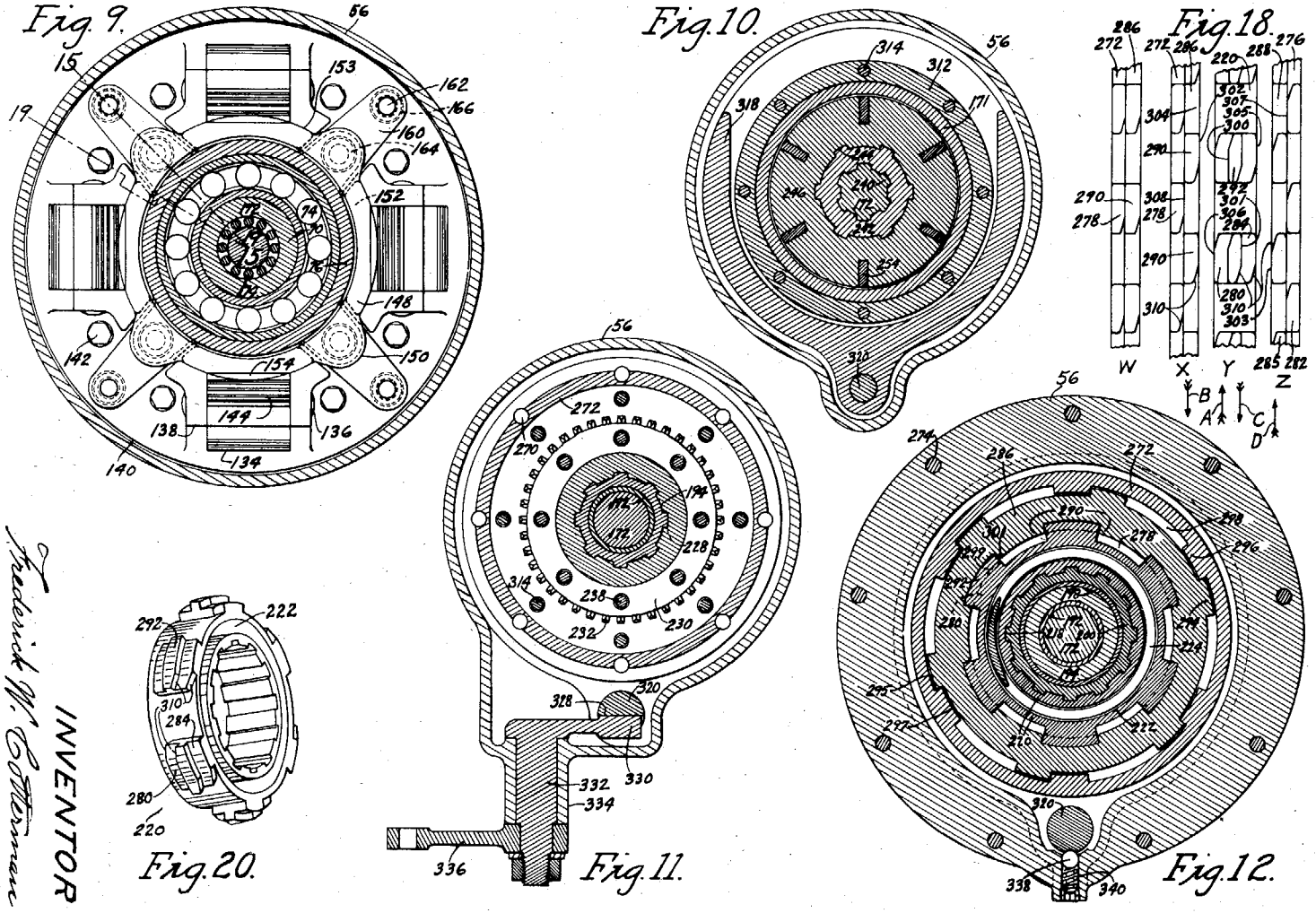
INVENTOR
Frederick W. Cotterman

PLANETARY AUTOMOTIVE TRANSMISSION GEARING

Original Filed June 15, 1935 4 Sheets-Sheet 4

INVENTOR

Frederick W. Cotterman

Reissued Apr. 9, 1940

Re. 21,418

UNITED STATES PATENT OFFICE 21,418

PLANETARY AUTOMOTIVE TRANSMISSION GEARING

Frederick W. Cotterman, Dayton, Ohio, assignor of one-half to Bessie D. Apple, Dayton, Ohio Original No. 2,142,866, dated January 3, 1939, Serial No. 26,765, June 15, 1935. Application for reissue March 17, 1939, Serial No. 262,541

45 Claims. (Cl. 74—260)

This invention relates to power transmission mechanism and embodies some of the features of my Patent No. 2,061,832, issued November 24th, 1936. It is particularly applicable to motor vehicles.

An object of the invention is to provide a transmission mechanism in which the greater portion of the driving range of a vehicle is done in direct drive with no gearing whatever operating either under load or idle.

A second object is to include in the mechanism a single planetary speed reducing gear-set, which may hereinafter be termed the underdrive, which is responsive to speed and torque and which becomes automatically operative when load conditions are such as to either decelerate the vehicle or prevent sufficient rapid acceleration thereof in direct drive, but which is nevertheless also subject to the will of the operator in that he may, by suddenly changing the amount of applied power by means of the engine throttle, cause the automatic clutch to act and change from gear drive to direct or vice versa as desired.

Another object is to connect the underdrive gear-set to the engine thru a fluid coupling, in order that considerably less reduction in speed need be had thru the gear-set, to the end that no engine rushing will result in bringing the vehicle from a dead stop thru the single speed reduction to a desirable speed for direct drive.

Another object is to include in the underdrive gear-set a plate friction clutch automatically engageable to provide direct drive and render the gearing inoperative, and a jaw brake automatically engageable to provide gear drive whenever the plate clutch is disengaged, to the end that the gearing may remain in constant mesh without including in the mechanism any such device as a roller clutch or a spring clutch, both of which have been found to be a source of trouble.

Another object is to provide, in the underdrive gear-set, a means comprising helical teeth on the gearing whereby the tangential load carried by the gearing causes an end thrust which urges disengagement of the plate clutch, and a centrifugal means operative by speed to urge engagement of the plate clutch for direct drive, the centrifugal device being, however, so controlled that it urges clutch engagement more nearly in direct proportion to the R. P. M., instead of in proportion to the square of the R. P. M. as in common practice, to the end that sufficient clutch engaging pressure may be had at a lower speed without having too great a clutch engaging pressure at high speed.

Another object is to provide, in a gear mechanism which automatically changes from gear drive to direct drive and vice versa, means for making the change from one drive to the other without a time interval between them, the one drive becoming effective before the other drive lets go, to the end that there will be no time between direct drive and gear drive in which there is no drive, as there is in conventional gear shift transmissions.

Another object is to include in the mechanism a planetary speed increasing gear-set, which may be hereinafter designated an overdrive and which may be made operative only above a relatively high predetermined speed and which becomes operative by momentary release of the applied engine torque, to the end that the lesser percentage of driving only which is done at very high speeds need be done thru this gearing, leaving all normal speeds to be effected without any gearing in operation.

Another object is to provide means thru which the same overdrive gear-set may be used also as a speed reducing gear-set for reversing the vehicle, to the end that no additional gears need be provided for this purpose.

Another object is to provide a manually operable means operative to three positions to provide forward, neutral, and reverse connections between the engine and the vehicle wheels, said means being positioned between the underdrive and overdrive gear-sets.

Another object is to so construct the overdrive gear-set as to insure its always being connected either in the speed increasing or in the direct driving relation by positive jaw members, to the end that no overrunning means such as roller or spring clutches need be used as is now done in common practice.

Another object is to provide means associated with the jaw members for the speed increasing connection and the direct drive connection of the overdrive gear-set which will permit said jaw members to engage only when their mating members have been brought into substantial synchronism, to the end that there will be no clashing when a shift from direct drive to the speed increasing gear drive and vice versa takes place.

Another object is to provide a centrifugal means for operating the overdrive gearing which will insure that when a shift from direct to overdrive or vice versa has once begun to take place the operation will not be interrupted until a complete change from one to the other has occurred.

That I attain these and many other objects and meritorious features will become apparent as the invention is described in more detail and reference is had to the drawings wherein, Fig. 1 is a longitudinal horizontal axial section thru the complete mechanism.

Fig. 2 is a fragmentary section taken at 2—2 of Fig. 1 showing a small portion of the centrifugal device which operates the overdrive gear connections.

Fig. 3 is a prospective view of the helical gear which is the sun gear of the underdrive gear-set, this view showing the jaw brake teeth on the end which, when effective, secure the gear against rotation.

Fig. 4 is a perspective view of a member which is secured to the housing of the underdrive gear-set and which has jaw brake teeth which engage the jaw brake teeth on the sun gear shown in Fig. 3.

Fig. 5 is a fragmentary section taken at 5—5 of Fig. 1 thru the hinge pin of one of the centrifugal weights which provide energy for urging the plate clutch of the underdrive gear-set into engagement.

Fig. 6 is a transverse section taken at 6—6 of Fig. 1 thru the underdrive gear-set and thru the plate clutch which surrounds the gears and eliminates their use upon engagement.

Fig. 7 is a transverse section taken at 7—7 of Fig. 1 thru the underdrive gear-set cutting thru the centrifugal weights and the hinge ears which support them and the clutch operating spider to which the weights apply their energy.

Fig. 8 is a transverse section taken at 8—8 of Fig. 1 thru the hinge pins of the underdrive centrifugal weights showing the clutch operating spider in elevation.

Fig. 9 is a transverse section taken at 9—9 of Fig. 1 thru the center bearing between the underdrive and overdrive and showing the underdrive clutch operating mechanism in elevation.

Fig. 10 is a transverse section taken at 10—10 of Fig. 1 thru the shifter fork of the manually operable forward, neutral and reverse mechanism and, nearer the axis, thru a part of the centrifugal device which operates the connections of the overdrive gear-set.

Fig. 11 is a transverse section taken at 11—11 of Fig. 1 thru the lever which operates the forward, neutral, and reverse mechanism, showing also nearer the axis the toothed clutch member provided for forward speed.

Fig. 12 is a transverse section taken at 12—12 of Fig. 1 thru the detent mechanism of the manually shiftable member and, more centrally, thru the automatic clutch mechanism of the overdrive gear-set.

Figure 15:
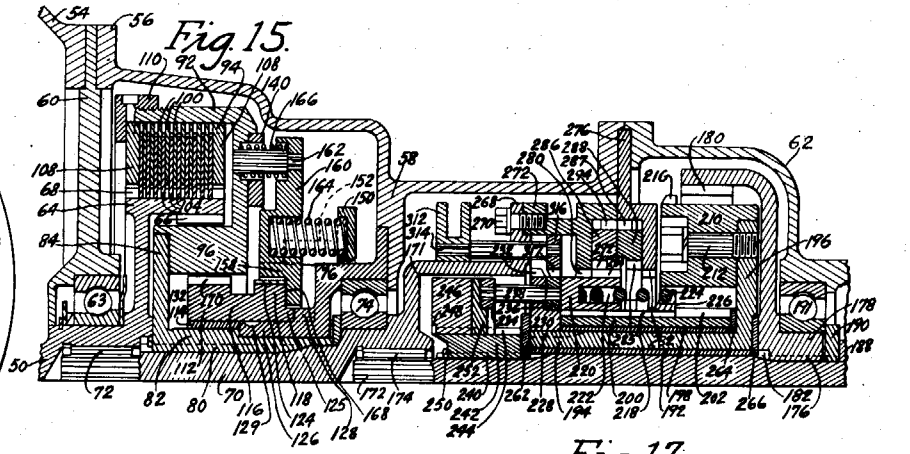

Fig. 15 is a partial longitudinal axial section taken at 45 degrees from the horizontal plane as on the line 15—15 of Fig. 9, cutting thru one leg of the underdrive clutch operating spider to show one of the larger springs which are variably energized by the centrifugal weights to urge clutch engagement and one of the smaller springs which urge clutch disengagement. also at the other end of the view to show the structure of the planet pinion carrier of the overdrive gear-set.

Fig. 16 is a diagram used to illustrate the effect of the underdrive clutch operating weights on the variably energized spring when their centers of gravity have swung out to various positions from 2½ degrees to 67 degrees with respect to their hinge pins.

Figure 17:
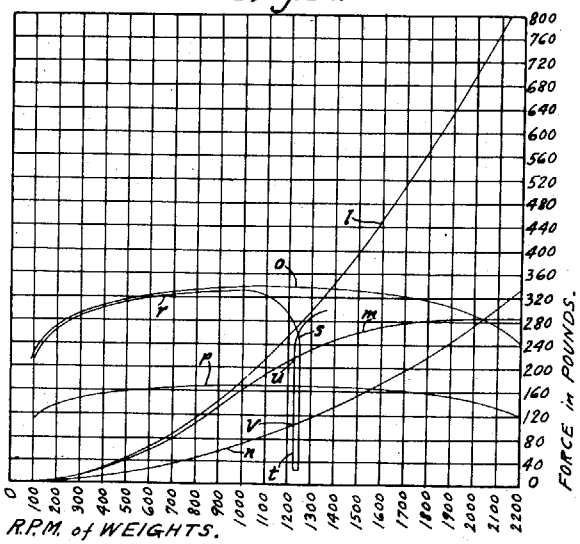

Fig. 17 is a chart to further illustrate how centrifugal force may be applied to provide clutch engaging pressure which increases more nearly in direct proportion to the R. P. M. instead of in proportion to the square of the R. P. M. as heretofore.

Fig. 18 is a schematic view employed to illustrate how the automatically operated overdrive jaw brake mechanism operates into engagement without clash.

Fig. 19 is a partial longitudinal axial section taken at 60 degrees from the horizontal plane as on the line 19—19 of Fig. 9 showing the manner of securing together the underdrive carrier which supports the planet pinions, the clutch operating mechanism and the driven element of the friction clutch.

Fig. 20 is a perspective view showing in detail the automatically shiftable clutch and brake member of the overdrive gear-set.

Similar numerals refer to similar parts thruout the several views.

The crank shaft 30 of an internal combustion engine carries a fluid coupling comprising the flywheel 32 to the outer face of which the cover 34 is secured by the screws 36. The cover 34 carries the driving vanes 38 and a hub 40 having a bearing bushing 42 within which the driven element 44 rotates.

The driven element 44 carries the vanes 46 and the central hollow journal 48 upon which the driven member has rotative bearing. The journal 48 is internally splined to receive the externally splined drive shaft 50 of the underdrive gear-set. The fluid coupling being of conventional design need not be further described.

The transmission housing 52 is secured to the flywheel cover 54 and comprises a main section 56 having a central partition 58, a front cover 60 and a rear cap 62, the underdrive gear-set being contained in the space forward of the partition 58, and the overdrive gear-set and manually operable forward, neutral, and reverse mechanism being contained in the space rearward of the said partition.

Both of the gear-sets herein employed are of the planetary type which comprises a sun gear, several planet pinions surrounding it and meshing therewith, a carrier for supporting the planet pinions for both rotation upon their axes and revolution about the sun gear, and a ring gear surrounding and meshing with all the planet pinions.

In the underdrive gear-set (see Figs. 1 and 6) the splined drive shaft 50 is rotatable in ball bearing 63 supported in the end plate 60 and has integral therewith the ring gear 64. Ring gear 64 has helical gear teeth 66 on the inside of the ring and external clutch teeth 68 on the outside, the gear teeth 66 being the driving means for gear drive and the clutch teeth 68 being the driving means for direct drive.

The driven shaft 70 of the underdrive gear-set is rotatable in roller bearing 72 supported in the end of the drive shaft 50, and in ball bearing 74 supported in the cage 76 secured by screws 78 to the center partition 58. The cage 76 is shown in detail in Fig. 4. Driven shaft 70 has external splines 80 over which the internally splined hub 82 of the planet pinion carrier 84 fits snugly. The carrier 84 supports four circumferentially equally spaced bearing studs 86 having roller cages 88 upon which the planet pinions 90 rotate in mesh with the teeth 66 of the ring gear 64.

The driven friction clutch member 92 has internal clutch teeth 94 (see Figs. 1 and 6) and a forwardly extending hub 96 (see Figs. 15 and 19) which fits over the edge of the carrier 84 and is secured thereto by the screws 98 (see Figs. 6 and 19). The hub 96 is completely cut away at four places as at 97 Fig. 6 to admit the planet pinions 90. The four studs 86 have their outer ends secured in the member 92 whereby said studs have support at both ends.

A series of driven clutch plates 100 have external teeth 102 extending between the internal teeth 94 of the member 92 while a second series of driving clutch plates 104 has internal teeth 106 extending between the external teeth 68 of the ring gear 64 (see Fig. 6). The outer driven clutch plates 108 are thicker than the remaining driven clutch plates 100. A large adjusting nut 110 is threaded over the outside of the member 92 to compensate for wear of the clutch plates.

The outside of the internally splined carrier hub 82 is ground smooth for a journal upon which the sun gear 112, shown in detail in Fig. 3, may rotate. A bearing bushing 114 is press fitted to the inside of the sun gear. An integral hub 116 extends rearwardly from the sun gear and is enlarged at 118 to provide a place for openings to contain the balls 120 and springs 122. A band 124 surrounds the hub to retain the springs in place. The extreme rear end of the hub is formed to compose jaw brake teeth 125.

Integral with bearing cage 76 and extending forwardly therefrom (see Figs. 1 and 4) is the hub 126 which has formed thereon the jaw brake teeth 128 which correspond to and are engageable with the jaw teeth 125 of the sun gear. The hub 126 extends into the space left between the inside diameter of the sun gear and the smaller end of the carrier hub 82.

Near the forward end of the hub 126 a round bottomed groove 129 extends completely around it. From this circular groove at equally spaced points around it the other round bottomed grooves extend rearwardly and somewhat helically, forming the guideways 130 within which the balls 120 act as followers which may move to carry the sun gear 112 rearwardly on the hub 126. The guideways 130 are slightly deeper at the rear end than they are where they join with the groove 129 so that the pressure on the balls creates a tendency to cause the gear to move rearwardly.

Fig. 1 shows the sun gear 112 when it is moved rearwardly as far as it will go with its jaw brake teeth 125 fully meshed with the jaw brake teeth 128 carried by the bearing cage 76, and with the balls 120 at the rearward and deepest end of the guideways 130. In this position the sun gear is held against backward rotation as it must be necessarily held to provide gear drive. The sun gear may, however, move forwardly on the hub 82 into the space 132 by drawing the balls 120 forwardly with it into the circular groove 129 whereupon the sun gear is free to rotate forwardly as it must during direct drive. The weight of the balls 120 and the strength of the springs 122 is preferably such that the centrifugal force of the balls becomes greater than the strength of the springs when the sun gear rotates as much as 600 R. P. M. This proportion will allow ample pressure on the balls inasmuch as the only time the balls need become operative as followers to press downward in the guideways and guide the jaw brake into engagement is when the sun gear 112 has come to a dead stop and starts rotating backwardly.

The balls 120, therefore, never exert any friction on the groove 129 or guideways 130 except for perhaps a fraction of a second each time the change from direct drive to gear drive and vice versa is taking place. As soon as the sun gear rotates forwardly in direct drive the balls raise up out of contact with the guideways and groove.

The guideways 130 are so located with respect to the teeth 128 and the balls 120 are so located with respect to the teeth 125 that whenever the balls follow the helical paths the mating brake teeth approach each other in proper relation for full depth engagement. This is important, for when a jaw brake is employed and permitted to engage without such guiding means it frequently happens that the mating teeth engage with a very shallow hold thus throwing an excessive strain on the points of the teeth which results usually in the engaged teeth slipping off and creating a jerk in the carrying of the load.

The four centrifugal clutch operating weights 134 are hinged by the pins 136 between pairs 138 of hinge ears extending from the plate 140 which is secured to the driven friction clutch member 92 by the screws 142 (see Fig. 19). Pinion teeth 144 extend across the rear end of the weights.

The spring compressing spider comprises the ring 148 having four ears 150 extending outwardly and four arcuate rack members 152 extending forwardly. The arcuate members have sliding bearing in the inner ends of the pairs of hinge ears 138 at 153 (see Figs. 7, 8 and 9). Rack teeth 154 corresponding to pinion teeth 144 are cut transversely across the outer surfaces of the arcuate rack members. The rack teeth 154 are in constant mesh with the pinion teeth 144 whereby outward swinging of the weights 134 moves the spring compressing spider forwardly.

The clutch operating spider comprises the ring 158 having four legs 160 extending radially outward. Each leg 160 carries a pin 162 which extends thru a hole in the driven friction clutch member 92 to compact the clutch plates together. Pockets extending into the legs of the clutch operating spider and corresponding pockets in the ears of the spring compressing spider receive the ends of the clutch engaging springs 164 (see Fig. 15). Similar pockets in the driven friction clutch member and the outer ends of the legs of the clutch operating spider receive the clutch release springs 166.

The ring 158 of the clutch operating spider rests against a shoulder of the sun gear at 168. The helical teeth 170 of the sun gear (see Fig. 3), are at such an angle that the gear drive load urges the sun gear rearwardly with considerable force which results in fully meshing its brake teeth 126 with the brake teeth 128. Outward movement of the weights 134 moves the rack members 152 and with them the ring 148 and ears 150 and thereby compresses the springs 164.

Therefore no matter what gear drive load is being impressed upon the sun gear to keep it in the rearward gear drive position, there is always some speed, if the same is attainable in gear drive under said load condition, at which the springs 164 will become sufficiently energized to overbalance the rearward thrust of the sun gear.

In speed torque controlled transmission mechanism as heretofore proposed, the weight members have been connected directly to the torque member which they were opposing, that is, the weight could never move from its inner or home position until the torque member which was opposing the weight yielded to the weight force. The torque member then yielded and the weight moved for the first time. The result was that the weight always applied a force to overcome the torque member which was proportional to the square of the R. P. M.

Thus if weights were used which opposed the torque member with a force of 1000 pounds at 2000 R. P. M., it would be desirable if the same weights at 1000 R. P. M. would oppose the torque member with a force of 500 pounds or more, that is, the weights should provide more than half the force at half the speed, but due to the fixed laws of centrifugal force there is created only one fourth the force at half the speed. The result is that if weights are designed correctly to give the desired force at a certain speed, they give too little force at half the speed, and if they are designed correctly to give the correct force at a certain speed, they give too great a force at twice that speed.

The foregoing is the principal reason why no speed-torque transmission has become commercially successful to date. In Figs. 1, 16 and 17, there is shown the manner in which this difficulty is obviated.

In the diagram Fig. 16, the point *a* represents a hinge pin 136, the point *b* represents the center of gravity of a weight 134 when the weight is in its inner or home position, the point *f* represents the center of gravity of the weight when it is in its outermost position, and the points *c*, *d*, and *e* represent the center of gravity of the weight at intermediate positions.

Now when rotation begins and the weight is at *b*, each pound centrifugal force in the direction of the arrow *g* exerts .999 pound on the rack teeth 154 in the direction of the arrow *q*. But when the weight has moved against the resistance of the spring 164 until it has reached the point *c* then each pound of centrifugal force exerted in the direction of the arrow *h* will apply only .947 pound to the rack teeth 154 in the direction of the arrow *q*. At points *d*, *e* and *f*, each pound centrifugal force applies .822, .633 and .390 pound respectively to the rack.

By calculating the centrifugal force of the weights at points *b*, *c*, *d*, *e* and *f* and finding their effect on the rack in the direction of the arrow *q* according to diagram Fig. 16, a chart Fig. 17 may be plotted showing that altho the centrifugal force of the four weights at various speeds is in accordance with the curve *l*, the effect of said force on the rack teeth 154 in the direction of the arrow *g* is in accordance with the curve *m*.

By consulting the chart it will be seen that while at 2040 R. P. M., of the weights the sun gear is urged forwardly by the weights with a force of 284 pounds at half the speed or 1020 R. P. M., it is still being urged forwardly with a force of 161 pounds, which is more than half as much force at half the speed. But, if the weight means had been conventional and designed to give the desired force of 284 pounds at 2040 R. P. M., then the sun gear would be urged forwardly according to the curve *n* which shows that at 1020 R. P. M., the sun gear would have been urged forwardly with a force of 71 pounds only instead of 161 pounds.

The speed torque unit is designed for an engine of 90 H. P. and if such an engine were producing its maximum torque curve, the rearward thrust on the sun gear would be in accordance with the curve *o*, and if it were producing half its maximum torque curve, the rearward thrust on the sun gear would be in accordance with the curve *p*.

It follows that with the controlled centrifugal force mechanism herein shown, when the engine is delivering maximum torque *o*, the clutch operating spider moves the sun gear forwardly and engages the plate clutch to change from gear drive to direct drive at 2040 R. P. M. of the weights, which is preferably approximately 35 M. P. H., of the vehicle, while when the engine is delivering half its maximum torque *p*, the change to direct drive takes place at 1020 R. P. M. of the weights which would be at approximately 17½ M. P. H.

With the conventional weight system producing the curve *n* and the engine delivering half torque *p*, the change to direct drive would not occur until 1560 R. P. M. of the weights or 26¼ M. P. H. It will be seen that with conventional weight mechanism and the engine at half torque, the shift to direct drive does not occur soon enough but occurs only at 25 percent less speed than when full torque is being provided.

Again a driver may desire to accelerate as rapidly as possible in gear drive to about 17½ M. P. H., then change to direct drive. He would therefore depress the accelerator pedal substantially fully to create the torque curve *r* until the weights revolved 1020 R. P. M., which is at about 17½ M. P. H., then he would release the accelerator pedal and the torque curve would drop rapidly as at *s*. When it has dropped enough to cross the curve *m* the change to direct drive would occur. Had the conventional system of centrifugal weights been used the change to direct drive would not have occured until the torque curve *rs* dropped below the curve *n*.

Now it is one of the characteristics of a speed-torque transmission that, after the torque curve has crossed from above to below the speed curve and direct drive has thereby been affected, the operator may immediately pull back into gear drive, if he desires to do so, by sufficient depression of the accelerator pedal to bring the torque curve back up as at *t* until it crosses the speed curve. With the controlled centrifugal mechanism this crossing takes place at *u* but with conventional centrifugal mechanism this crossing would have taken place at *v*.

Fig. 17 shows that, with the speed torque mechanism, herein shown, if a shift up to direct has been purposely made at medium speed, as by the curve *rs*, a considerably higher torque may be applied without returning to gear drive than may be applied in ordinary speed-torque mechanism. The result is that when a driver purposely shifts to direct drive at moderate speed he need not fear that a light application of power in direct drive will cause a return to gear drive. In short, the chart shows that after purposely shifting from gear drive to direct drive at 17½ M. P. H., the operator of the device herein shown may apply twice the power and still remain in direct drive as he could with ordinary speed-torque controlled mechanism. This is as it should be, for the engine has a higher torque at intermediate speeds than at the higher speeds and it is therefore undesirable to have a mechanism which will not permit a reasonable application of that higher torque when in direct drive without having it return to gear drive.

The driven shaft 70 of the underdrive gear-set which is the driving shaft of the overdrive gear-set has integral therewith at its rear end the cup 171. Different members and combinations of members are connected to or disconnected from the cup 171 to provide forward direct drive, forward overdrive, neutral, and reverse.

In a planetary gear train of the type shown comprising the three main elements, that is, the ring gear usually designated as R, the planet pinion carrier designated as C and the sun gear designated as S, it is well known that (1) if S is held against rotation, R is made the driver, and C is made the driven, as is the case in the underdrive gear-set hereinbefore described, a reduction in speed will be provided; (2) that is S if held against rotation C is made the driver and R the driven an increase in speed will be provided; (3) that if any two members such as S and C are both made drivers while R is made the driven, a direct drive will be provided; (4) that if C is held against rotation while S is made the driver and R the driven, R will rotate in the reverse direction; and (5) that if S only is made the driver while R is the driven and C is left wholly free, C will run idle slowly forward and no driving connection will be had between the driving and driven members.

The underdrive gear-set hereinbefore described employs the first of the above connections, while the mechanism now to be described makes all of the remaining connections, that is, 2 to 5, some manually and some automatically, manual means being provided to elect between allowing the vehicle to stand still, moving it forwardly, or moving it rearwardly, while automatic means are provided to change from direct-forward to overdrive-forward and vice versa at predetermined speeds.

The driven shaft 172 of the overdrive gear-set is rotatably supported at the front end in roller bearing 174 held in the end of the shaft 70. At the rear end the shaft 172 has splines 176. Closely fitted to these splines is the hub 178 of the ring gear 180. Hub 178 is drawn against the shoulder 182 of the shaft by the screw 184 thru intermediate members 186, 188 and 190 and the ball bearing 191. The ball bearing 191 is supported in the end cap 62.

Figure 14:
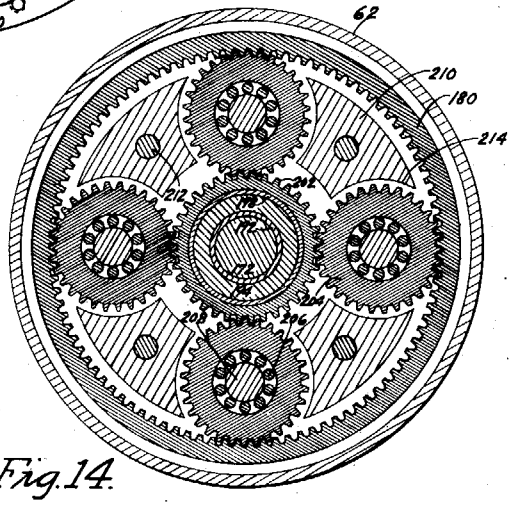
Fig. 14 is a transverse section taken at 14—14 of Fig. 1 thru the overdrive gearing and thru a portion of the planet pinion carrier.
Figure 13:
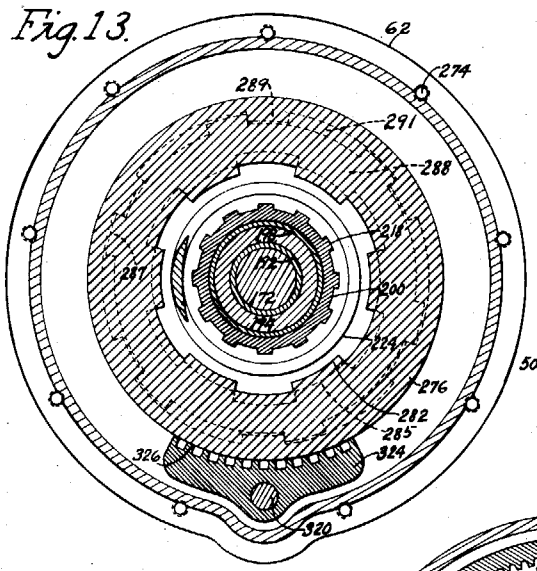
Fig. 13 is a transverse section taken at 13—13 of Fig. 1 thru the toothed reversing segment and, more centrally, thru a part of the automatic brake mechanism of the overdrive gear-set.

Immediately surrounding the shaft 172 is the long bearing bushing 192 and next outside of this is the long hub 194 of the planet pinion carrier 196. Surrounding the hub 194 is a second long bearing sleeve 198 and around this is the long hub 200 of the sun gear 202 (see Figs. 12 to 14).

Four planet pinions 204 are in constant mesh with the sun gear 202 and the ring gear 180 and have rotative bearing on the roller bearings 206 held on studs 208 supported at one end in the carrier 196, and at the other end in the ring 210 which fits around the periphery and to the face of the carrier 196 and is secured thereto by the screws 212 (see Fig. 15). The ring 210 is cut away at four places as at 214, Fig. 14, to make room for the planet pinions 204. A series of fine brake teeth 216 extend completely around the ring 210 at its forward edge. The teeth 216 are provided as a means for holding the carrier 196 against rotation when it is desired to rotate the ring gear 180 backwardly of the rotation of the crankshaft 30.

The outside of the long hub 200 of the sun gear 202 has long external splines 218 (see Figs. 12 and 13) upon which the internally splined automatic clutch and brake collar 220, shown in detail in Fig. 20, is freely slidable. The clutch and brake collar 220 has a deep groove 222 in its rearward face to provide space for the forward end of the spring 224, the rear end of the spring being held by the ring 226 which surrounds the splines 218 and rests against the ends of the teeth of the sun gear 202. Spring 224 urges the collar 220 forwardly.

The outside of the long hub 194 of the carrier 196 is externally splined at 228. An internally splined clutch member 230 is press fitted over the splines 228. Clutch member 230 has a series of fine clutch teeth 232 around its periphery (see Fig. 11).

Two bronze end-thrust rings 234 and 236 are connected by a series of studs 238 which are fitted slidably into a series of openings in the clutch member 230. The ring 236 rests against the forward end of the collar 220.

Near its forward end the driven shaft 172 has splines 240 to which the internally splined sleeve 242 is fitted snugly (see Fig. 10). Sleeve 242 also has external splines 244. At the forward end of the sleeve 242 an internally splined collar 246 is fitted closely, resting against the shoulder 248 to prevent forward movement of the collar 246 on sleeve 242. A snap ring 250 holds sleeve 242 in place.

Resting against the rear face of the collar 246 is an internally spined plate 252 slidable on the external splines 244 of the sleeve 242 (see Fig. 15). The plate 252 has a series of forwardly extending blades 254 (see Figs. 1, 2 and 10) which are cut off at an angle on their inner edges, as at 256 the collar 246 having a series of slots extending at a corresponding angle to receive the blades.

An equal number of wider slots 258 extend radially in the rear face of the collar 246 and in these are a series of small contrifugal weights 260, beveled on their outer ends to correspond to the beveled inner edges of the blades 254. Movement of the weights 260 from the position shown to their extreme outer position in the slots 258 moves the end-thrust ring 234 rearward against the clutch member 230 thereby causing the thrust-ring 236 to move the automatic clutch and brake collar 220 rearward against the ring 226. End thrust washers 262, 264 and 266 are provided to limit endwise movement of the several parts.

The purpose of having the clutch and brake collar 220 splinedly slidable on the sun gear 202, and of providing the centrifugal means for moving the said collar from the position shown to a position farther rearward, is to cause the sun gear 202 which is shown connected for rotation with the driving cup 171 to be connected at a predetermined speed to a member which will hold it against rotation. The parts which accomplish this purpose will now be described.

Secured to the flange 268 of the cup 171 by the screws 270 is the sun gear driving member 272. Secured between parts 56 and 62 of the housing by the screws 274 is the sun gear holding member 276. The sun gear driving member 272 has internal teeth 278 (see Fig. 12) between which the smaller portions 280 of the teeth of the collar 220 (see Fig. 20) fit closely but slidably.

The sun gear holding member 276 has internal teeth 282 (see Figs. 1 and 13) between which the smaller portion 284 of the teeth of the collar 220 fit closely but slidably.

Between the driving member 272 and holding member 276 are two shut out plates 286 and 288. These shut out plates have internal teeth 290 and 285 respectively (see Figs. 12 and 13) between which the larger portions 292 of the teeth of the collar 220 fit closely but slidably. The shut out plates also have external teeth 294 and 287 (see Figs. 12 and 13) which extend between internal teeth 296 and 289 of the members 272 and 276. The spaces 298 and 291 between the teeth 296 and 289 (see Figs. 12 and 13) are enough larger than the teeth 294 and 287 to permit limited rotative movement of the shut out plates, this limited rotative movement being just enough to align the internal teeth 278 with the internal teeth 290 when the plate is in the position shown in Fig. 12, and just enough to misalign the teeth 278 with the teeth 290 an amount which will cause the teeth 278 to come circumferentially midway between the teeth 290 when a shut out plate is turned the other direction as far as the teeth 294 may be turned in the larger spaces 298.

The limited rotative movement of shut out plate 288 which misaligns its teeth 285 and 282 is opposite to that of plate 286, it being necessary that plate 286 be dragged counterclockwise with respect to the driving member 272 to misalign the teeth 278 and 290, and that 288 be dragged clockwise with respect to holding member 276 to misalign the teeth 282 and 285.

The shut out plates are, moreover, slightly smaller in diameter than the spaces within which they are contained providing a looseness as at 295 and 297 (see Fig. 12). This looseness permits the shut out plates to drop to a slightly eccentric position whenever the clutch and brake collar teeth are not fully inserted in driving relation.

For instance, when the collar 220 attempts to enter into driving relation, the looseness and consequent eccentricity of the shut out plate 286 causes the outer ends of the teeth 280 of the collar 220 to drag the inner ends of the teeth 290 of the shut out plate and shift the shut out plate as far as the teeth 294 will permit it to be shifted, thereby misaligning the teeth 278 and 290. The corners of teeth 280 and 290 are round at 299 and 301 respectively so that when a shut out plate is dragged as far as its limiting teeth 294 will permit it, the teeth 290 may ride over the tops of the teeth 280 by coming to a concentric position. The shut out plates 286 and 288 are duplicates except that one is right and the other left and they are dragged oppositely to misalign their teeth as above indicated.

The diagram Fig. 18 shows first at W the sun gear driving member 272 with its internal teeth 278 aligned with the internal teeth 290 of the shut out plate 286 just as they are in Fig. 12. At X is shown how the teeth 290 of the shut out plate 286 become misaligned with the teeth 278 of the driving member 272 when the shut out plate is rotated counterclockwise to the other limit of its rotary movement. At Y is shown the low parts 280 and 284 and the high parts 292 of the teeth of the clutch and brake collar 220. At Z is shown the sun gear holding member 276 and its shut out plate 288 with their respective teeth 282 and 285 misaligned.

From the diagram Fig. 18 it will be seen that when a shut out plate becomes turned to its limit in one direction, the teeth of the collar 220 may not enter but when it becomes turned to its limit in the other direction the teeth may enter, because with the teeth misaligned as at X, the edge 300 of the tooth 292 will be riding against the edge 302 of the tooth 290, but when Y rotates with respect to X in the direction of the arrow A, until the edge 300 is over the space 304 where it could enter, it will be prevented because then the edge 306 of a tooth 280 will be riding against the edge 308 of a tooth 278.

It follows that as long as the rotation of X and Y with respect to each other is according to arrows A and B the teeth of Y cannot enter the teeth of X, but if and when respective rotation ceases to be according to the arrows A and B and starts to become the opposite, the shut out plate will move and align the teeth as at W, whereupon the teeth of Y will enter those of W, that is, the teeth 280 will be within the spaces between the teeth 278 while teeth 292 will be within the spaces between the teeth 290 which constitutes full driving engagement.

Similarly as long as the rotation of Y and Z with respect to each other is according to the arrows C and D the teeth 285 and 282 will remain misaligned and will prevent the entry of the teeth of Y into those of Z, but if and when respective rotation starts to become the opposite of said arrows, the shut out plate will move and align the teeth of Z, whereupon the teeth of Y will enter those of Z.

From the foregoing it will be understood that while the centrifugal weights 260 may develop force enough to act and move the collar 220 out of engagement with the sun gear driving member 272 it may not engage said collar with the sun gear holding member until said collar has been allowed to drop to zero revolutions. Also while the centrifugal weights may lose force enough to allow the spring to move the collar 220 out of engagement with the sun gear holding member 276, it may not engage said collar with the sun gear driving member 272 until said collar has been brought up to a speed synchronous with the then speed of the said sun gear driving member. The beveled edges 310 of the teeth facilitate entry thereof as synchronism is reached.

Surrounding the driving cup 171 is the grooved collar 312 which is connected by a series of pins 314 passing slidably thru the flange 268 to a ring 316 having fine internal teeth 317 adapted to be drawn into engagement with the teeth 232 of the clutch member 230.

Grooved collar 312 receives the shifting fork 318 which is secured to the shifting rod 320 by the pin 322. At the rear end of the rod 320 is secured the segment 324 having the fine teeth 326 adapted for engagement with the teeth 216 of the carrier ring 210. A vertical slot 328 extending half way thru the rod 320 receives the lower end of the arm 330 which is rocked by the shaft 332 in bearing hub 334, the shaft being actuated by the lever 336 (see Fig. 11). A detent ball 338 and spring 340 is provided to hold the rod 320 in the forward position for forward driving, in the rearward position for reversing, or in the intermediate or neutral position shown for maintaining the vehicle at rest. Any suitable means may be provided to operate the lever 336, such as control knob, lever, or handle within convenient reach of the operator with a rod, wire or other means connecting said lever thereto.

*Proportion*

While the transmission shown may be designed for an engine of any ordinary horsepower some indication of the proportion for a given horsepower may preferably be set forth.

With an engine of 85 to 90 H. P. at 3800 to 4200 R. P. M., and a total vehicle weight of around 2600 to 2900 pounds, the proportion of most of the parts may be gotten by taking the largest diameter of the housing 56 as 11¼" and making all other parts of the mechanism to the same scale. Some of the dimensions which may not readily be gotten by scaling the drawings are as follows:

The helix angle of the underdrive gear-set should be 23 degrees. The ring gear should have a pitch diameter of 5.158 inches and have 76 teeth, the sun gear a pitch diameter of 3.258 inches and have 48 teeth, and the planet pinions a pitch diameter of .950 inch and have 14 teeth. The rule for ratio when the sun gear is held against rotation and the ring is the driver is, one revolution of the driven carrier C is provided by $$\frac{R+S}{R}$$

revolutions of the driver R. The underdrive ring R must therefore revolve $$\frac{76+48}{76}=1.631$$

revolutions to 1 of the carrier C.

In planetary gearing of the type herein employed the ratio available is confined to narrow limits, being always less than 2 to 1 and more than 1 to 1, the practical limit being reached at about 1¾ to 1 for high and 1¼ to 1 for low reduction. The ration of 2 to 1 would be obtainable only if it were possible to make the diameter of the sun gear equal to the diameter of the ring gear and the planet zero diameter, while the ratio of 1 to 1 would be obtainable only were it possible to make the planets half the ring gear diameter and the sun gear zero diameter.

The underdrive gear-set selected herein is therefore near the practical limit of reduction. This reduction would be insufficient if this gear-set were used with an ordinary flywheel friction clutch, but with the fluid coupling it is ample for the reason that the fluid coupling permits the engine to speed up to its best torque producing speed while the vehicle speed is still very low. The combination of this type of underdrive gear-set with a fluid coupling is therefore considered as a valuable feature of the invention.

The four underdrive centrifugal weights 134 when made to the scale indicated will weigh .394 pound each. The four underdrive clutch engaging springs 164 are made of steel wire $\frac{3}{32}$" diameter, coiled to ½" pitch diameter, have seven coils, and a free height of $1\frac{3}{16}$". The four clutch release springs 166 are of wire $\frac{1}{16}$" diameter coiled to $\frac{7}{16}$" pitch diameter, have eight coils and a free height of ⅞".

The helix angle of the overdrive gear-set should be 14 degrees 55 minutes. The ring gear should have a pitch diameter of 6.209 inches and have 96 teeth, the sun gear a pitch diameter of 2.329 inches and have 36 teeth and the planet pinions a pitch diameter of 1.940 inches and have 30 teeth.

When reversing is to be done in a gear-set of this type the sun gear is made the driver and the carrier is held stationary, the ring gear being the driven member. The rule in this case is 1 revolution of the sun gear produces $$\frac{S}{R}$$

revolutions of R backwardly. The reversing ratio then is 36/96, that is, the sun gear must rotate 2⅔ turns to rotate the ring gear backwardly one turn.

When the overdrive is to be effected the sun gear is held against rotation and the planet pinion carrier made the driver. The rule in such case is one revolution of the carrier produces $$\frac{R+S}{R}$$

revolutions of the ring gear. The overdrive ratio is then $$1 \text{ to } \frac{96+36}{96}=1 \text{ to } 1.375$$

The overdrive shifting spring 224 is preferably made of $\frac{3}{32}$" diameter steel wire coiled to 2⅞" pitch diameter, having five coils, and a free height of 4". The weights 260 should be made to scale and due to the difficulty of determining the friction of the various parts to be moved and the friction of the weights themselves, six weights are provided. By calculation these will produce force to overcome the spring 224 considerably in excess of that needed, but when six weights are equally spaced, either two of them, three of them, or four of them may be removed and still maintain accurate balance. The number of weights should be found by trial so that they will overcome the spring 224 and all friction of the parts at about 50 M. P. H.

The transmission proportioned as shown and used with the power and vehicle weight indicated should be used in conjunction with a rear axle having a ratio of 1 to 4.9. This will provide engine-to-wheel ratios of 8 to 1 when the underdrive gear is in operation, 4.9 to 1 when in direct drive, and 3.56 when in overdrive.

According to present practice the 8 to 1 ratio for low speed would be considered insufficient, but when coupled with a fluid coupling instead of a clutch this is ample reduction, due to the fact that the engine slips the coupling and therefore almost instantly rises to its best torque point. The fact is, that with a fluid coupling, more torque may be applied to the wheels with an 8 to 1 ratio at 0 to 10 M. P. H., than may be applied with a ratio of 10 or 11 to 1 when an ordinary flywheel clutch is used.

*Operation*

The operation of the mechanism may be carried out as follows:

With the manually shiftable rod 320 in the intermediate position as indicated in Fig. 1 of the drawings, the sun gear 202 only is connected to the driving member 171 whereby the driving member 171 may rotate freely without rotating the driven ring gear 180, the carrier 196 rotating idly forward at $\frac{3}{11}$ engine speed. In this state the engine may be started and warmed up if necessary.

The manually movable lever 336 may then be drawn top forward to move the rod 320 rearward to engage the teeth 326 of the segment 324 with the teeth 216 of the carrier ring 210. The engine accelerator is then depressed and the ring gear 64 of the underdrive rotates clockwise. (By clockwise is meant clockwise looking from a position in front of the engine.) The carrier 84, being now coupled to the vehicle, resists turning. This starts the sun gear 112 rotating counter-clockwise.

When the sun gear tries to rotate counterclockwise, the helical teeth 170 and the helical guideways 130 which get deeper toward the rear, both move the sun gear helically rearward for about ⅙ revolution, whereupon the jaw brake teeth 125 and 128 are fully engaged and no further counterclockwise rotation of the sun gear can take place. The carrier is then forced to rotate clockwise and turn the shaft 70 which turns the cup 171 clockwise.

The cup 171 is at this time connected to the sun gear 202 thru the member 272 and the automatic clutch and brake collar 220. The sun gear 202 is therefore driven clockwise. The carrier 196 is being held against rotation by the segment 324. The ring gear 180 therefore turns counterclockwise and the vehicle is reversed, the engine-to-wheel ratio being 21 to 1.

But upon backing up the vehicle over long distances, if the load is light and the speed reaches as much as 6 M. P. H., the underdrive gear may shift to direct drive whereupon the reversing engine-to-wheel ratio becomes 13 to 1.

After the vehicle is backed as far as desired and brought to a stop the manual lever may be moved top rearward. This draws the rod 320 forward and engages the teeth 317 of the ring 316 with the teeth 232 of the clutch member 230. This connects the carrier 196 to the driving cup 171. The sun gear is already connected to the driving cup 171 thru the collar 220. The overdrive gears will therefore revolve as a unit and will provide no change in speed.

The engine accelerator is now depressed and the underdrive gear 64 rotates forwardly, causing the sun gear 112 to engage the jaws 125 and 128 as before explained thereby providing a speed reduction of 1.631 to 1 which with a 4.9 rear axle provides an engine to wheel ratio of 8 to 1. The overdrive being now inoperative, the shafts 70 and 172 are revolving at the same speed.

While the vehicle is thus operated in underdrive the weights 134 move outwardly or inwardly as the speed increases or decreases, thereby raising or lowering the pressure with which the clutch engaging springs urge the sun gear 112 forwardly. As the driver depresses the accelerator more or less he raises or lowers the rearward thrust on the sun gear caused by the helical teeth.

Any time and at any speed the operator may release the accelerator sufficiently to cause the rearward load created thrust to be less than the forward weight created thrust and thus allow the sun gear to move axially forward about ⅛".

This does not instantly change the underdrive to direct drive because when the sun gear has been pushed forwardly about ⅛", the pins 182 press the friction clutch discs 100 and 104 together. The jaw teeth 125 and 128 being about ¼" long are not out of mesh and therefore momentarily continue the gear drive in effect. But the friction between the rubbing clutch discs altho not great at the first touch, nevertheless takes some of the load off of the gearing.

When it takes some of the load off of the gearing the rearward thrust on the sun gear 112 is just that much less, and being less permits more of the clutch engaging pressure of the springs 164 to be applied to the discs, which, rubbing harder, takes more load off of the gearing. This is repeated over a period of several seconds whereupon enough of the spring pressure is applied to the discs to allow the driving discs 104 to revolve more nearly at the same speed as the driven discs 100 than the ratio of 1.631 to 1 of the gears, whereupon all of the load is removed from the sun gear 112 and it is rotated clockwise.

As soon as this occurs, the jaw teeth 125 and 128, the guideways 130 and the helical teeth 170 all cooperate to move the sun gear forwardly and completely disengage the jaw teeth. The helical teeth alone will keep them disengaged as long as the sun gear 112 rotates forwardly, which is as long as direct drive is in effect.

Instantly the sun gear rotates forwardly, if the speed has been raised as much as 10 M. P. H., the followers 120, which have been pressing downwardly in the groove 129 and guideways 130 while the sun gear was non-rotative, now rise against the springs and remove the friction between the followers and the guideways and groove.

In the foregoing description of the operation of changing from underdrive to direct drive it was assumed that the operator so depressed the engine accelerator as to cause a rearward axial thrust on the sun gear 112 somewhat as at *r* in Fig. 17, then slacked up to cause the thrust to drop as at *s* until it crossed the force curve *m* of the springs 164, Fig. 15, and thereby change to direct drive.

The operator may, however, use his accelerator so as to create the maximum engine torque which will produce an axially rearward pressure on the sun gear according to the curve *o* Fig. 17, and the change to direct drive will occur, whether he desires it or not, at 2040 R. P. M. of the weights which is at 35 M. P. H. This point may be varied to suit the individual makers but it is considered bad driving to raise the speed of an engine of this class higher than about ⅔ of the top speed when in gear because at ⅔ of top speed the engine torque curve begins to drop rapidly and not only is power produced at less efficiency but the additional engine speed is destructive if indulged in too constantly.

The operator may also by halfway depressing the accelerator and keeping it constantly so depressed create the curve *p*. If he does so and does not vary his accelerator setting the change to direct drive will take place at 1020 R. P. M. of the weights or 17½ M. P. H.

Having created the torque curve *r* or *p* and permitted it to cross the spring curve *m* as in Fig. 17, and thereby changed to direct drive, the operator may, if he has not waited until he is too close to 35 M. P. H., sharply depress his accelerator pedal and, if he can create enough torque to raise his torque curve above the spring curve, change back from direct to gear drive.

Thus he may choose to shift to direct at 7 M. P. H., which is at 400 R. P. M., of the weights, but if he then applies enough torque to create 30 pounds rearward sun gear thrust he will shift back into gear. He may next choose to shift to direct at 14 M. P. H., 800 R. P. M. of the weights, but if he then applies enough torque to create more than 110 pounds rearward sun gear thrust he will shift back into gear. He may next choose to shift to direct at 28 M. P. H., 1600 R. P. M. of the weights. He may now apply enough torque to create a rearward sun gear thrust of 275 pounds before he will return to gear (see curve *m* Fig. 17). At this speed, 1600 R. P. M. of the weights, 325 pounds rearward sun gear thrust is the most that may be created (see curve *o* Fig. 17). Therefore at 28 M. P. H., $$\frac{275}{325}$$

or about 85 percent of maximum torque may be applied after a change to direct drive without enforcing a return to gear drive. With speed-torque mechanism heretofore proposed, had the shift to direct taken place at 28 M. P. H., the most torque that could be applied without shifting back to gear would have been 175 pounds (see curve *n* Fig. 17) which would have been $$\frac{175}{325}$$

or about 53 percent of maximum at that speed.

In a speed-torque transmission it is desirable that after a shift to direct drive, a return to gear drive may be had when the occasion for maximum acceleration suddenly arises. But it is undesirable that after a shift to direct drive has occurred a depression of the accelerator representing a too small percentage of its maximum should return the mechanism to gear drive.

When such occasion as stated arises, it is easy to depress the accelerator substantially fully until a return to gear drive is enforced. Whether it is then maintained fully depressed depends on the need. Mechanical and vacuum devices have been patented to obviate the inherent defect in speed-torque devices just mentioned. The manner of accomplishing the same result more simply and effectively is one of the important features of the invention.

With an engine of the size and a vehicle of the weight indicated, a 4.9 to 1 axle would be considered too slow if an overdrive were not provided. For in direct drive the engine would reach top speed at about 77 M. P. H. Therefore while speeds from 0 to 50 M. P. H., are driven with the best portion of the engine torque curve effective, when driven in direct drive with a 4.9 to 1 axle, speeds above 50 M. P. H., are driven with the best portion of the engine torque curve effective, when driven in direct with about a 3.5 to 1 axle. The overdrive gearing herein employed is therefore such as to create the equivalent of driving in direct with a 3.56 to 1 rear axle.

The automatic shift to overdrive will now be described:

The small centrifugal weights 260 and the spring 224 are in such proportion that, at 50 M. P. H., the weight force exceeds the spring force by just enough to overcome the friction of moving the clutch and brake collar 220 rearwardly when all load has been removed from its teeth by release of the accelerator pedal. Therefore, at any time that a speed of 50 M. P. H., is being exceeded, the driver may release the accelerator and the outward movement of the weights will move the collar 220 and slide its teeth 280 and 292 out from between the teeth 278 and 290 of the driving plate 272 and shutout plate 286 respectively.

Now when the teeth of the clutch and brake collar are shifted out of mesh, as above indicated, the collar is rotating 2900 R. P. M., or more. Its teeth 292 and 284 are about to enter the teeth 285 of the shut out plate 288 and the teeth 282 of the holding member 276 both of which are secured against rotation. The first thing that occurs is that the ends of the teeth 284 of the collar rub the ends of the slightly eccentric teeth 285 of the shut out plate and center it as well as drag it forward with respect to the holding member as far as the limiting teeth 287 and 289 will permit (see Fig. 13), thus dragging the teeth 285 into misalignment with the teeth 282 (see Fig. 18 at Z).

By this time the collar 220 has reached a rearward position where the edges 301 of the teeth 292 are rubbing the edges 303 of the teeth 285 while the edges 305 of the teeth 284 are rubbing the edges 307 of the teeth 282. As long as the teeth 285 and 282 remain thus misaligned the collar may rotate freely but may not move farther rearwardly into mesh.

Inasmuch, however, as the accelerator has been released and the engine is losing speed very much faster than the vehicle, within one or two seconds a point is reached where the engine is driving the carrier 196 about 37½ percent slower than the movement of the vehicle is rotating the ring gear 180. At this difference in speed the rotation of the sun gear 202 has entirely ceased. The slightest further reduction in engine speed starts the sun gear rotating backwardly which movement causes the teeth 292 of the collar 220 to drag the teeth 285 of the shut out plate 288 backwardly into alignment with the teeth 282 of the holding member 276, whereupon full engagement of the teeth 292 and 284 with the teeth 285 and 282 will be effected.

When the accelerator pedal is now depressed the propeller shaft 185 will revolve faster than the engine speed in the ratio of 1.375 revolutions to 1 of the engine.

It will be noticed that there is a considerable radial movement of the weights 260 when they move from their inward to their outward position, the weights being 1⅗ as far from the axis of rotation when clear out as when clear in. It follows that when, at 50 M. P. H., for instance, the weights are allowed to move to their outward position they require either 1⅗ as much spring force at the same speed, 50 M. P. H., to return them, or else a reduction in speed.

By so proportioning the spring 224 that its strength is increased only about ⅕ by compression from the length shown to the length which will be had when the weights are fully out, there is left a margin of ⅖ of the weight force which may be wiped out after a shift up to 50 M. P. H., by a reduction to about 45 M. P. H., before the spring can overcome the weights and move inwardly.

At any time then before 45 M. P. H., that the operator desires to do so he may momentarily release the accelerator pedal whereupon the spring 224, then having a force in excess of the weights 260 will move the collar 220 forward. When the collar first starts forward it is not rotating. Its teeth 280 therefore rub on the forwardly rotating teeth 290 of the shut out plate 286 and drag them backward with respect to the teeth 278 of the driving plate 272 as at X Fig. 18. When, however, the accelerator is depressed until the engine gains about 37½ percent in speed the collar 220 will be revolving as fast as the driving plate 272. Thereafter, the slightest increase in engine speed will cause the shut out plate to be turned from the position X to the position W Fig. 18, whereupon the collar teeth enter and full direct drive engagement is again established.

Having described an embodiment of my invention in which the objects hereinbefore set forth are attained, I claim:

1. In a planetary transmission mechanism, an underdrive gear-set comprising a driving member, a driven member, an internal ring gear on the driving member, a planet pinion carrier on the driven member, planet pinions carried by said carrier in constant mesh with said ring gear, a sun gear in constant mesh with said planet pinions, means to hold said sun gear against backward rotation, a clutch for connecting said driving member and said driven member to rotate in unison, and means operative by torque load on said sun gear to hold said clutch in disconnected position.

2. In a planetary transmission mechanism, an underdrive gear-set comprising a driving member, a driven member, an internal ring gear on the driving member, a planet pinion carrier on the driven member, planet pinions carried by said carrier in constant mesh with said ring gear, a sun gear in constant mesh with said planet pinions, means to hold said sun gear against backward rotation, a clutch for connecting said driving and driven members for rotation in unison, speed responsive means for operating said clutch, and means made operative by a torque load on said sun gear to oppose said speed responsive means.

3. In a planetary transmission mechanism, an underdrive gear-set comprising a driving member, a driven member, an internal ring gear on the driving member, a planet pinion carrier on the driven member, planet pinions carried by said carrier in constant mesh with said ring gear, a sun gear in constant mesh with said planet pinions, means to hold said sun gear against rotation, a clutch for connecting said driving and driven members for rotation in unison, speed responsive means urging release of said holding means and engagement of said clutch, and torque responsive means on the sun gear operative by overload on said clutch to move said holding means to engaged position and said clutch to disengaged position.

4. In a planetary transmission mechanism, an underdrive gear-set comprising a drving member, a driven member, an internal ring gear on the driving member, a planet pinion carrier on the driven member, planet pinions carried by said carrier in constant mesh with said ring gear, a sun gear in constant mesh with said planet pinions, means engageable to hold said sun gear against rotation, a clutch for connecting said driving and driven members for rotation in unison, speed responsive means for urging disengagement of said holding means and engagement of said clutch, and torque responsive means for opposing said speed responsive means, operative by movement of said sun gear due to load transferred thereto upon slippage of said clutch to disengage said clutch and engage said holding means.

5. In a planetary transmission mechanism, a housing, an underdrive gear-set within said housing comprising a driving member, a driven member, an internal ring gear on the driving member, a planet pinion carrier on the driven member, planet pinions carried by said carrier in constant mesh with said ring gear, a sun gear in constant mesh with said planet pinions, means secured to said housing engageable with axially movable means on said sun gear for holding said sun gear against rotation, a clutch for connecting said driving and driven members to rotate in unison, speed responsive means urging said sun gear axially out of engagement with said holding means and said clutch into engagement, and torque responsive means on said sun gear opposing said speed responsive means, operative upon slippage of said clutch and transferring of the load to said sun gear to move said sun gear axially and thereby engage said holding means and disengage said clutch.

6. In a planetary transmission mechanism, a housing, an underdrive gear-set within said housing comprising a driving member, a driven member, an internal ring gear on the driving member, a planet pinion carrier on the driven member, planet pinions carried by said carrier in constant mesh with said ring gear, a sun gear in constant mesh with said planet pinions, jaw brake means secured against rotation to said housing, corresponding jaw brake means on said sun gear engageable with the housing jaw brake means for holding said sun gear against rotation, a clutch means on the ring gear and corresponding clutch means on the carrier engageable for connecting the ring gear and carrier to revolve in unison, speed responsive means urging engagement of the said jaw brake and engagement of said clutch, and torque responsive means on said sun gear urging engagement of said jaw brake and disengagement of said clutch.

7. The structure defined in claim 6 wherein the speed responsive means is a centrifugal device, and the gearing has helical teeth angled to cause the torque reaction on the sun gear, due to the power being transmitted, to urge the sun gear jaw brake axially into engagement and the clutch axially out of engagement, and the centrifugal device urges the jaw brake axially out of engagement and the clutch axially into engagement.

8. In a planetary transmission mechanism, a housing, an underdrive gear-set within said housing including a gear to be held against rotation for gear drive and to be rotated for direct drive, said gear having space to move axially, a jaw brake member carried on one end of said gear, a mating jaw brake member secured against rotation to said housing, one of said jaw brake members having helical guiding means terminating in an annular guiding means, a spring impressed follower carried by the other jaw brake member, said guiding means and said follower being so located and related as to cause the teeth of one jaw brake member to be guided into the spaces between the teeth of the other jaw brake member when the said gear rotates in one direction, and to cause the teeth of the jaw brake members to be drawn out of engagement when the said gear rotates in the other direction, the annular guiding means being so located that the follower may move therein without further moving the said gear axially when the jaw teeth are disengaged and the direct connecting means becomes effective.

9. The structure defined in claim 8 wherein the guiding means are sloping grooves into which the follower may extend deeper as it moves toward jaw brake engagement.

10. In a planetary transmission mechanism, a housing, an underdrive gear-set within said housing including a gear to be held against rotation for gear drive and to be rotated for direct drive, said gear having space to move axially, a jaw brake member carried on one end of said gear, a mating jaw brake member secured against rotation to said housing, said mating jaw brake member having helical guiding means, a spring impressed follower carried by said gear jaw brake member, said guiding means and follower being so located and related as to cause the teeth of one jaw brake member to be guided into the spaces between the teeth of the other jaw brake member when the said gear rotates in the one direction and to cause the teeth of the jaw brake members to be drawn out of engagement when the said gear rotates in the other direction, the follower and spring being so proportioned that the spring presses the follower into the guide when the gear is substantially nonrotative but the centrifugal force of the follower overcomes the spring and relieves the pressure of the follower in the guide when the gear rotates.

11. Power transmission mechanism comprising, a driving member, a driven member, a clutch for connecting said members directly, gearing for connecting said members around the clutch upon disengagement thereof, a member movable to engage the clutch, a speed responsive member movable by a change in speed to different positions toward and away from said clutch engaging member, resilient means connecting said speed responsive member and said clutch engaging member variably stressed by movement of said speed responsive member whereby is varied the degree with which said clutch engaging member is urged to move to effect clutch engagement, and a torque responsive means resisting and preventing movement of said clutch engaging member into position to effect clutch engagement unless and until said speed responsive member has been moved to a position which stresses the said resilient member in excess of the resistance of said torque responsive means.

12. The structure defined in claim 11 with means whereby the speed responsive member stresses the resilient member substantially in direct proportion to the speed.

13. The structure defined in claim 11 having centrifugal weight means to operate the speed responsive member and linkage operative to apply a progressively smaller proportion of the total centrifugal force of said weight means to the speed responsive member as the speed of rotation of the weight means increases.

14. The structure defined in claim 11 having centrifugal weights hinged to swing outwardly to operate the speed responsive member, the swinging movement of said weights being such that their centers of gravity each defines an arc all or the greater part of which is farther from the axis of rotation than the hinge pins.

15. A planetary overdrive gear-set comprising, a driving member, a driven member, an internal ring gear on the driven member, a planet pinion carrier, planet pinions on said carrier in constant mesh with said ring gear, a sun gear in constant mesh with said planet pinions, means for connecting said driving member to said sun gear while said carrier is left free to rotate, means for holding said carrier against rotation while said sun gear alone is connected to the driving member, means for connecting said carrier to the driving member while said sun gear is also connected to the driving member, and means for disconnecting said sun gear from said driving member and hold it against rotation while said carrier alone is connected to said driving member.

16. The structure defined in claim 15 wherein the means for connecting the carrier to the driving member, and the means for holding the carrier against rotation is manually operable, while the means for connecting the driving member to the sun gear and the means for holding the sun gear against rotation is automatically operable.

17. The structure defined in claim 15 wherein a speed responsive means is operable above a predetermined speed by release of the torque load being transmitted to disengage the means connecting the driving member and sun gear and apply the means for holding the sun gear against rotation, and operable below a predetermined speed by release of the torque load being transmitted, to release the means holding the sun gear against rotation and engage the means connecting the driving member and sun gear.

18. A planetary overdrive gear-set comprising a housing, a driven member within said housing, an internal ring gear on said driven member, planet pinions in constant mesh with said ring gear, a planet pinion carrier for revolving said planet pinions, a driving member for driving said carrier, a sun gear in mesh with said pinions, a toothed driving member for rotating said sun gear, a toothed holding member for holding said sun gear against rotation, a toothed member on said sun gear, a centrifugal device on said driven member, and means operable by said centrifugal device below a predetermined speed to engage said toothed sun gear member with said toothed driving member and above a predetermined speed to engage said toothed sun gear member with said toothed holding member.

19. The structure defined in claim 18 having a shut out member to prevent the teeth of the said sun gear member entering the teeth of the said driving member unless and until both are revolving at substantially equal speeds, and a shut out member to prevent the teeth of the said sun gear member entering the teeth of the said holding member unless and until both are substantially non-rotating.

20. In a transmission mechanism, two toothed clutch members, means for urging said clutch members into toothed engagement while they are rotating at different speeds, and shut out means for preventing said toothed engagement being effected unless and until said members are brought to substantially the same speed, said shut out means comprising, a shut out member having limited rotatable displacement with respect to one clutch member by rubbing contact with the second clutch member, said displacement being of such degree as will cause the teeth of the first clutch member being aligned with the spaces between teeth of the shut out member when said shut out member is rotatably displaced in one direction and will cause the teeth of the first clutch member to be aligned with the teeth of the shut out member when said shut out member is rotatably displaced in the other direction, the teeth of the second clutch member being of such size and shape as may enter into the spaces formed between the teeth of the first clutch member and the shut out member when said teeth are aligned but will not enter the spaces formed between the teeth of the first clutch member and the shut out member when said teeth are misaligned.

21. In a transmission mechanism, a housing, an underdrive gear-set within said housing comprising, a driving member, a driven member, an internal ring gear on the driving member, a planet pinion carrier on the driven member, planet pinions rotatably supported by said carrier in mesh with said ring gear, a sun gear in mesh with said pinions, a brake part held against rotation by said housing, a corresponding brake part on said sun gear engageable with said housing brake part by axial movement of said sun gear, a main clutch for connecting the driving and driven members to revolve in unison, axially movable means for disengaging said main clutch, speed responsive means for moving said axially movable means to engage said main clutch, helical teeth on said gears angled to cause axial movement of the sun gear when load is being carried thereby, and means movable by said axial movement of said sun gear to engage the said brake parts and disengage the said main clutch.

22. A combined overdrive, direct drive, neutral, and reverse gear mechanism comprising, a driving member, a driven member, a gear secured to the driven member, planet pinions in mesh with said gear, a sun gear in mesh with said planet pinions, a planet pinion carrier, brake means to hold said sun gear against rotation, clutch means to drivably connect said sun gear to said driving member, means for optionally connecting said carrier to said driving member, for freeing said carrier from said driving member, or for holding said carrier against rotation, and means for either releasing said clutch means and engaging said brake means or for releasing said brake means and engaging said clutch means.

23. A combined overdrive, direct drive, neutral, and reverse gear mechanism comprising, a driving member, a driven member, a gear secured to the driven member, planet pinions in mesh with said gear, a sun gear in mesh with said planet pinions, a planet pinion carrier, clutch means operative upon engagement to connect the driving member and sun gear for rotation in unison, clutch means operative upon engagement to connect the driving member and carrier for rotation in unison, brake means operative upon engagement to secure the sun gear against rotation, and brake means operative upon engagement to secure the carrier against rotation.

24. The structure defined in claim 23 wherein a manual means is operable in one direction to engage the second mentioned clutch means and disengage the second mentioned brake means and operable in the other direction to engage the second mentioned brake means and disengage the second mentioned clutch means.

25. The structure defined in claim 23 wherein a means is automatically operable at a predetermined speed to engage the first mentioned brake means and disengage the first mentioned clutch means, and automatically operable at a predetermined speed to engage the first mentioned clutch means and disengage the first mentioned brake means.

26. The structure defined in claim 23 wherein a manual means is operable in one direction to engage the second mentioned clutch means and disengage the second mentioned brake means, and operable in the other direction to engage the second mentioned brake means and disengage the second mentioned clutch means, and wherein a means is automatically operable at a predetermined speed to engage the first mentioned brake means and disengage the first mentioned clutch means, and automatically operable at predetermined speed to engage the first mentioned clutch means and disengage the first mentioned brake means.

27. Power transmission mechanism comprising, a driving member, a driven member, a clutch for connecting said members directly, gearing for connecting said members around the clutch upon disengagement thereof, resilient means under stress applicable to said clutch to effect engagement thereof, centrifugal weights movable outwardly to increase the stress of said resilient means, and weight force applying means for applying the force of said weights to said resilient means, the leverage thru which said weights act being such that as the weights move out due to increase in speed the effective length of the power arm of the lever decreases.

28. Power transmission mechanism comprising, a driving member, a driven member, a clutch for connecting said members directly, gearing for connecting said members around the clutch upon disengagement thereof, resilient means under stress applicable to said clutch to effect engagement, speed responsive means associated with said resilient means adapted upon any change in speed to cause a change in the stress of said resilient means, and torque responsive means operative by load on said gearing to create a pressure in opposition to the stress of said resilient means, whereby any torque load sufficient to balance the stress of the resilient means will prevent said resilient means from applying its stress to effect clutch engagement.

29. The structure defined in claim 28 in which the speed responsive means is a centrifugal weight, the outward force of which varies as the square of the R. P. M. and the resilient means is a spring, and the effective leverage thru which the weight force is applied to stress the spring is arranged to become progressively shorter as the weights reach a higher speed and thereby assume a position farther from the axis of rotation, whereby the stress of the resilient means is increased at a rate which is less than in proportion to the square of the R. P. M.

30. Power transmission mechanism comprising, a driving member, a driven member, an internal ring gear on the driving member, a planet pinion carrier on the driven member, planet pinions rotatably supported by said carrier in mesh with said ring gear, a sun gear in mesh with said planet pinions, a non-rotatable member, means on said sun gear engageable with said non-rotatable member, means operative by torque on said sun gear for moving it into engagement with said non-rotatable member, a clutch for connecting said driving and driven members directly, and a member connecting said sun gear and clutch whereby movement of said sun gear into engagement with the non-rotatable member disengages said clutch.

31. In a change speed gearing, the combination of a drive shaft, a driven shaft, change speed planetary gearing between said shafts including a sun gear, an orbit gear connected to the driven shaft, a planetary carrier and its pinion meshing with said sun and orbit gears, and speed responsive controlled means on the driven shaft for connecting said sun gear to revolve with said carrier or to hold it from rotation.

32. In a change speed gearing, the combination of a drive shaft, a driven shaft, a change speed planetary gearing between said shafts including a sun gear, an orbit gear connected to the driven shaft, a planetary carrier and its pinion meshing with said sun and orbit gears, shiftable clutch and brake means for connecting said sun gear to revolve with said carrier or hold it from rotation, and speed responsive means on the driven shaft controlling said clutch and brake means.

33. In an overdrive gear mechanism, an input member, an output member, change speed gearing for connecting said members including a sun gear, a gear on the output member axially aligned with the sun gear, a planetary carrier adapted to be driven by the input member, and a pinion on said carrier in mesh with both said gears, shiftable clutch and brake means for connecting said sun gear to revolve with said carrier or hold it against rotation, and speed responsive means on the output member for controlling said clutch and brake means.

34. In an overdrive gear mechanism, a driven member, a gear on said driven member, a sun gear axially aligned therewith, a planet pinion in mesh with both gears, a carrier for said pinion, means to rotate the carrier, clutch means for connecting said sun gear for rotation with said carrier, brake means for holding said sun gear against rotation, and speed responsive means on the driven member for controlling said clutch and brake means.

35. Overdrive gearing comprising, a driven gear, a sun gear coaxial therewith, a planet pinion in mesh with both gears, a carrier for said pinion, power input means to rotate said carrier, clutch means for connecting said sun gear to rotate with said power input means and carrier, brake means for holding said sun gear non-rotative, and means responsive to driven gear speed for disengaging said clutch means and engaging said brake means.

36. In overdrive gearing, a driven gear, a sun gear coaxial therewith, a planet pinion in mesh with both gears, a planet pinion carrier, means for rotating said carrier, clutch means for connecting said sun gear to revolve with said carrier brake means for arresting rotation of said sun gear, and speed responsive means having unitary rotation with the driven gear for controlling said clutch and brake means.

37. In overdrive gearing, a driven gear, a sun gear coaxial therewith, a planet pinion in mesh with both gears, a planet pinion carrier, means for rotating said carrier, a shiftable member, a spring for shifting said shiftable member, clutch means engageable by movement of said shiftable member by said spring in one direction to connect said sun gear to rotate with said carrier, a speed responsive device on the driven member for shifting said shiftable member, and brake means engageable by movement of said shiftable member by said speed responsive device in another direction to arrest rotation of said gun gear.

38. Overdrive gearing comprising, a driven gear, a sun gear coaxial therewith, a planet pinion in mesh with both gears, a planet pinion carrier, power means for rotating said carrier, a shiftable clutch and brake member, clutch means engageable by movement of said shiftable member in one direction to connect said sun gear to revolve with said carrier, brake means engageable by movement of said shiftable member in another direction to arrest rotation of said sun gear, and speed responsive means secured for rotation with the driven gear for moving said shiftable member at a predetermined rise in speed to engage said brake member.

39. In an overdrive gear structure, a housing, a driven member, a driven gear thereon, a sun gear coaxial therewith, planet pinions in mesh with both gears, a planet pinion carrier, a driving member for rotating said carrier, a clutch element on the sun gear, a corresponding clutch element on the driving member, a brake element on the sun gear, a corresponding brake element on the housing, and a centrifugally controlled device including centrifugal weights on the driven member and a spring normally holding said clutch parts engaged, said weights being operable above a predetermined speed to overcome said spring disengage said clutch parts, engage said brake parts, and hold said brake parts engaged.

40. A planetary overdrive gear comprising, a housing, a driven member, a driven gear thereon, a sun gear coaxial therewith, planet pinions in mesh with both gears, a carrier for said pinions, a driving member for rotating said carrier, a shiftable clutch and brake member on the sun gear, a clutch part on the driving member, a brake part on the housing, and means including a centrifugal device on the driven member operative to normally hold said shiftable member engaged with said clutch part but operative above a predetermined speed to engage said shiftable member with said brake part.

41. A three element planetary gear set comprising a sun gear, a coaxial gear, planet pinions in mesh with both gears, and a carrier for the said pinions, wherein the coaxial gear drives and the carrier is driven, in combination with means to hold the sun gear against rotation, a clutch for connecting said coaxial gear and carrier for unitary rotation, and means made operative by the reaction of the sun gear due to torque load thereon to hold the clutch fully disengaged.

42. A three element planetary gear-set comprising a sun gear, a coaxial gear, planet pinions in mesh with both gears, and a carrier for the pinions, wherein the coaxial gear drives and the carrier is driven, in combination with means to hold the sun gear against backward rotation, a clutch for connecting said coaxial gear to the carrier for unitary rotation, helical gear teeth on the gears angled to cause an end thrust in the sun gear under load, and means movable by said thrust to hold the clutch in fully disengaged position while said gears are carrying the load.

43. The combination with a planetary gear-set comprising, a sun gear, a coaxial gear, planet pinions in mesh with both gears, and a planet pinion carrier, wherein the coaxial gear drives and the carrier is driven, of means to hold the sun gear against backward rotation, a clutch for connecting said coaxial gear to the carrier for unitary rotation, speed responsive means for engaging the clutch, helical teeth on the gears causing an axial thrust under load, said sun gear having space to move axially under said load, and means connecting said sun gear and clutch whereby said axial movement draws said clutch to fully engaged position.

44. In combination, a planetary gear set comprising a sun gear, a coaxial gear, planet pinions in mesh with both gears and a carrier for said pinions, wherein the coaxial gear drives and the carrier is driven, means to hold the sun gear against backward rotation, a clutch for connecting said coaxial gear to the carrier for unitary rotation, a resilient means associated with said clutch which may be stressed and applied to said clutch to maintain it in engagement, means responsive to driven member speed for varying the stress of said resilient means in proportion as the speed varies, helical teeth on the gears causing an axial thrust under load, said sun gear having space to move axially under said load, and means interposed between said sun gear and the resilient member of said clutch operative by said sun gear movement to withhold said resilient means from applying its effort to engage said clutch.

45. Power transmission gearing comprising, a driving member, a driven member, a clutch for connecting said members directly, gearing for connecting said members around the clutch upon disengagement thereof, a clutch engaging member, a stressed resilient means having one end against the clutch engaging member urging it to engage the clutch, a stressing member against the other end of said resilient means, a centrifugal weight for moving said stressing member to stress said resilient means, said weight being hinged at a point out from the axis of rotation, the center of gravity of said weight being away from the hinge point and in its normal position being located relative to the axis of rotation not much within or beyond the hinge point, but adapted as the speed increases to swing outwardly thru an arc all or the greater part of which is farther from the axis than the hinge point, and means turned by said weight about said hinge point to move said stressing member to stress said resilient means, whereby said resilient means is stressed at a rate which is less than in proportion to the square of the R. P. M.

FREDERICK W. COTTERMAN.